(12) United States Patent
Yabu et al.

(10) Patent No.: US 8,233,238 B2
(45) Date of Patent: Jul. 31, 2012

(54) DISK DRIVE SUSPENSION

(75) Inventors: Ryosuke Yabu, Ogaki (JP); Masakazu Sugino, Ogaki (JP)

(73) Assignees: NHK Spring Co., Ltd., Yokohama-Shi (JP); Ogaki Seiko Co., Ltd., Ogaki-Shi (JP)

( * ) Notice: Subject to any disclaimer, the term of this patent is extended or adjusted under 35 U.S.C. 154(b) by 103 days.

(21) Appl. No.: 12/757,204

(22) Filed: Apr. 9, 2010

(65) Prior Publication Data

US 2010/0265620 A1    Oct. 21, 2010

(30) Foreign Application Priority Data

Apr. 15, 2009  (JP) ................................ 2009-099111

(51) Int. Cl.
*G11B 21/21* (2006.01)
(52) U.S. Cl. .................................................. 360/244.5
(58) Field of Classification Search ........................ None
See application file for complete search history.

(56) References Cited

U.S. PATENT DOCUMENTS

| | | | | |
|---|---|---|---|---|
| 4,991,045 A * | 2/1991 | Oberg | .......................... | 360/244.3 |
| 5,313,355 A * | 5/1994 | Hagen | .......................... | 360/244.5 |
| 5,715,117 A * | 2/1998 | Brooks | ...................... | 360/244.5 |
| 5,862,019 A * | 1/1999 | Larson | ....................... | 360/265.8 |
| 6,634,084 B1 * | 10/2003 | Schmidt et al. | ............ | 29/603.03 |
| 6,704,163 B1 * | 3/2004 | Detjens et al. | ............. | 360/244.5 |
| 6,710,978 B2 * | 3/2004 | Holaway et al. | ........... | 360/245.2 |
| 7,207,097 B2 * | 4/2007 | Detjens et al. | ............. | 29/603.06 |
| 2004/0184193 A1 * | 9/2004 | Honda et al. | .............. | 360/244.2 |

FOREIGN PATENT DOCUMENTS

| | | |
|---|---|---|
| JP | 7-192420 A | 7/1995 |
| JP | 2007-287296 A | 11/2007 |
| JP | 2008-4142 A | 1/2008 |

\* cited by examiner

*Primary Examiner* — Mark Blouin
(74) *Attorney, Agent, or Firm* — Holtz, Holtz, Goodman & Chick, PC

(57) ABSTRACT

In a disk drive suspension including a baseplate and a load beam, a boss portion and protrusions are formed on the baseplate. The protrusions are formed in positions on a first surface of the baseplate off a reference mounting surface in contact with a suspension bearing surface of an actuator arm. Further, the protrusions are formed on a second surface located opposite from the first surface and project relative to the thickness of the baseplate. These protrusions serve to prevent a plurality of baseplates from closely contacting one another during their manufacture.

5 Claims, 7 Drawing Sheets

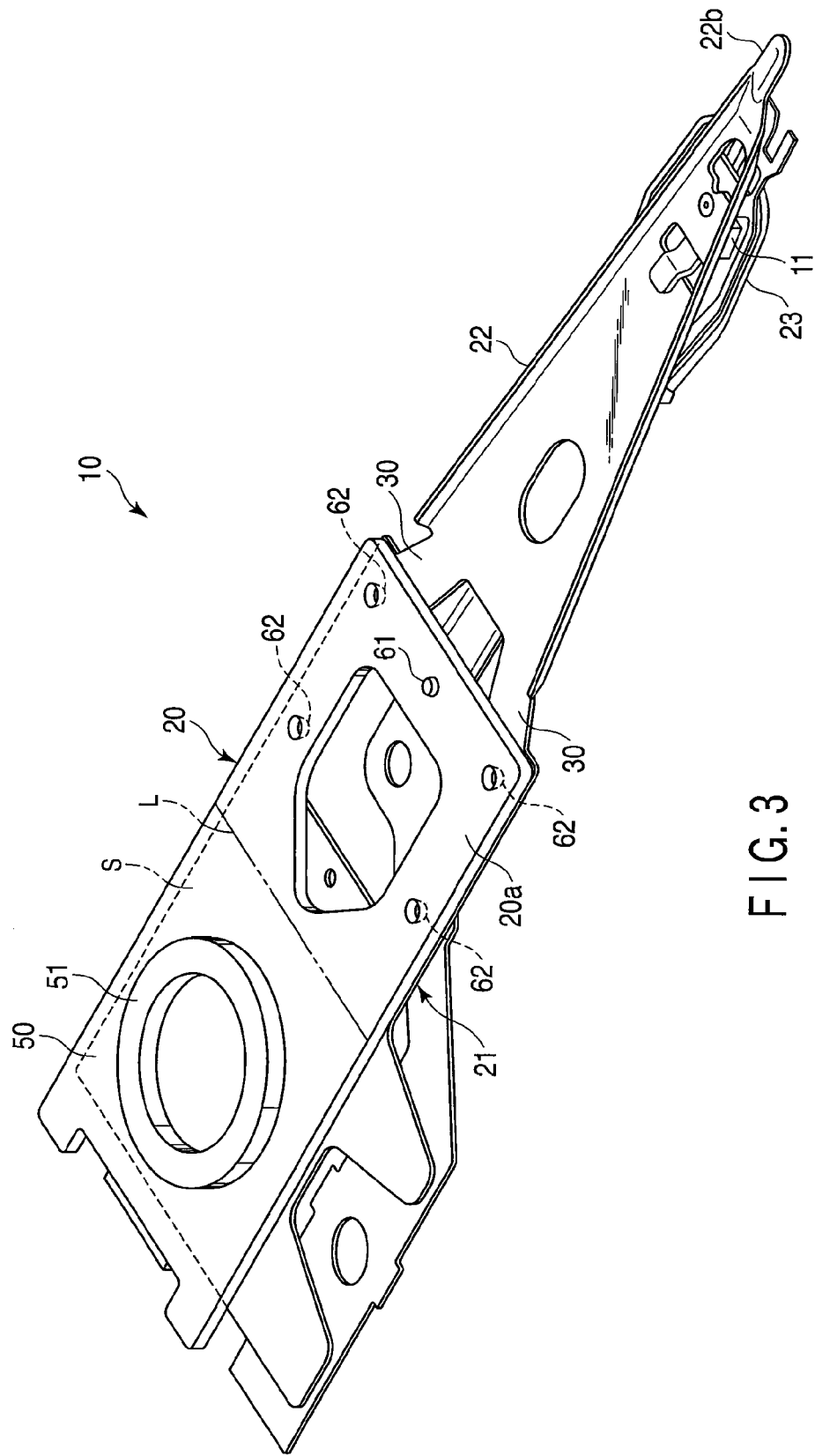
F I G. 3

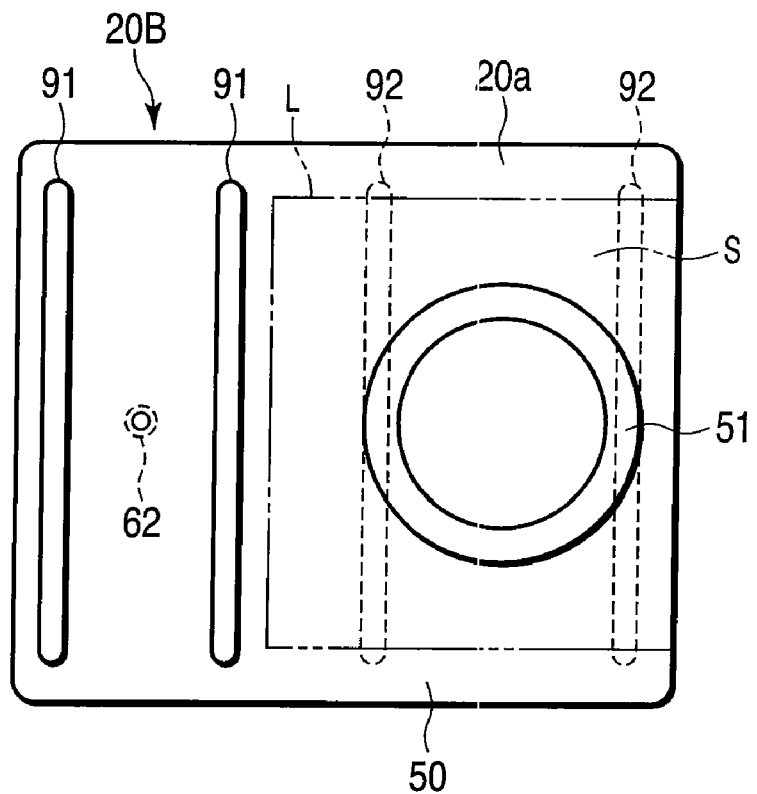
F I G. 9
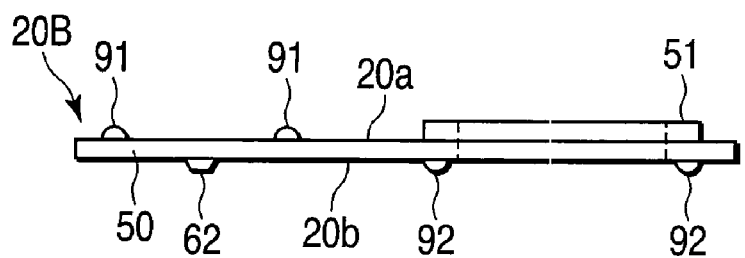
F I G. 10

DISK DRIVE SUSPENSION

CROSS-REFERENCE TO RELATED APPLICATIONS

This application is based upon and claims the benefit of priority from prior Japanese Patent Application No. 2009-099111, filed Apr. 15, 2009, the entire contents of which are incorporated herein by reference.

BACKGROUND OF THE INVENTION

1. Field of the Invention

The present invention relates to a baseplate of a disk drive suspension, and more particularly, to a baseplate free from sticking during manufacture.

2. Description of the Related Art

A hard disk drive (HDD) is used in an information processing device such as a personal computer. The HDD comprises a magnetic disk rotatable about a spindle, a carriage arm (actuator arm) turnable about a pivot, etc. A disk drive suspension (hereinafter simply referred to as a "suspension") is disposed on the distal end portion of the actuator arm.

The suspension comprises a baseplate, load beam, flexure, etc. The baseplate is fixed to the actuator arm. The load beam is mounted on the baseplate. The flexure is located along the load beam. A slider is mounted on a tongue portion formed on the flexure. A transducer is disposed on the slider. The transducer is an element for reading or writing.

As described in Jpn. Pat. Appln. KOKAI Publications Nos. 2007-287296, 2008-004142, and 7-192420, the baseplate of the suspension is fixed to a suspension bearing surface of the actuator arm. For example, a boss portion formed on the baseplate is inserted into a hole in the actuator arm. The baseplate is fixed to the actuator arm in such a manner that the boss portion is pressed by a jig from the inside and expanded by plastic deformation.

As one such method in which the baseplate is fixed to the actuator arm by expanding the boss portion as described above, there is a diameter expanding process such as ball caulking disclosed in Jpn. Pat. Appln. KOKAI Publication No. 7-192420. In this diameter expanding process, the boss portion of the baseplate is fitted into the hole in the actuator arm. A steel ball for use as a caulking jig is press-fitted into the hole in the boss portion through one opening and discharged through the other opening. Thereupon, the diameter of the boss portion is expanded. The expanded boss portion is tightly fitted to the inner surface of the hole in the actuator arm. Consequently, the baseplate is fixed to the actuator arm.

The baseplate is fabricated by press forming. Since the baseplate is work-hardened, the boss portion is unduly hard. Accordingly, the baseplate is adjusted to a hardness suitable for the diameter expanding process by a heat treatment.

The heat treatment is simultaneously performed for a plurality of baseplates. In this heat treatment, a large number of baseplates are collectively charged at random into a heating furnace. In some cases, therefore, the baseplates may be heated with their flat surfaces accidentally overlapping one another. If the flat surfaces are in contact with one another as the baseplates are heat-treated, surface substances of the baseplates may sometimes be stuck to one another by, for example, diffusion bonding.

In some cases, moreover, the baseplates may be surface-treated in order to remove solid particulate dust from the surfaces of the baseplates or make the surfaces suitable for the ball caulking. If the flat surfaces of the surface-treated baseplates contact one another, the baseplates may be stuck to one another by a surface tension or the like.

If the baseplates stuck in this manner are forced to be separated, they are inevitably deformed and become unusable. Thus, if the baseplates stick to one another, the yield rate of production is reduced.

BRIEF SUMMARY OF THE INVENTION

The present invention provides a disk drive suspension configured so that a plurality of baseplates can be prevented from sticking to one another in baseplate manufacturing processes or the like.

The invention is a disk drive suspension which comprises a baseplate fixed to a suspension bearing surface of an actuator arm of a disk drive and a load beam mounted on the baseplate. The baseplate comprises a first surface including a reference mounting surface in contact with the suspension bearing surface of the actuator arm, a second surface located opposite from the first surface, a boss portion configured to be inserted into a mounting hole formed in the actuator arm, and a protrusion formed so as to project outwardly relative to the thickness of the baseplate from at least one of the second surface and a part of the first surface off the reference mounting surface.

In an aspect of the invention, the protrusion is formed on each of the first and second surfaces of the baseplate. A hole into which the protrusion is inserted may be formed in that region of the load beam which overlaps the baseplate. Further, the protrusion may be shaped so as to project in a circular arc from the first or second surface along a profile relative to the thickness of the baseplate. In another aspect of the invention, the protrusion is formed of a rough surface comprising a large number of minute irregularities on the baseplate.

According to the present invention, a plurality of baseplates can be prevented from sticking to one another even when they are handled at random in baseplate manufacturing processes or the like. Thus, the yield rate of baseplate production can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a perspective view of a suspension according to a first embodiment of the invention;

FIG. 9 is a plan view of a baseplate according to a third embodiment of the invention;

FIG. 10 is a side view of the baseplate shown in FIG. 9;

DETAILED DESCRIPTION OF THE INVENTION

A first embodiment of the present invention will now be described with reference to FIGS. 1 to 7.

Figure 1:
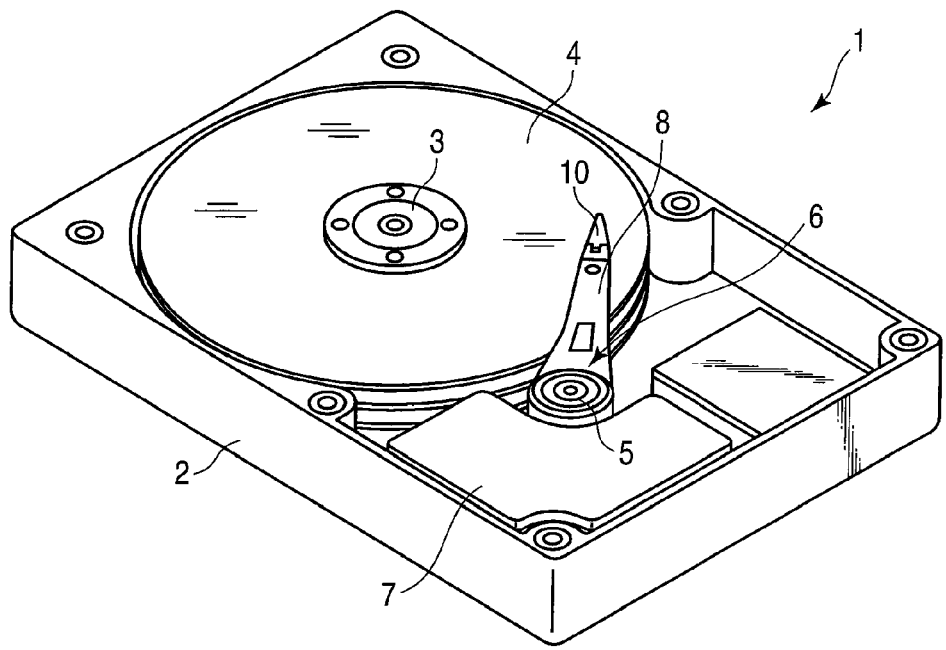
FIG. 1 is a perspective view showing an example of a disk drive.

A hard disk drive (HDD) 1 shown in FIG. 1 comprises a case 2, disks 4, carriage 6, positioning motor 7, etc. The disks 4 are rotatable about a spindle 3. The carriage 6 is turnable about a pivot 5. The positioning motor 7 drives the carriage 6. The case 2 is sealed by a lid (not shown).

Figure 2:
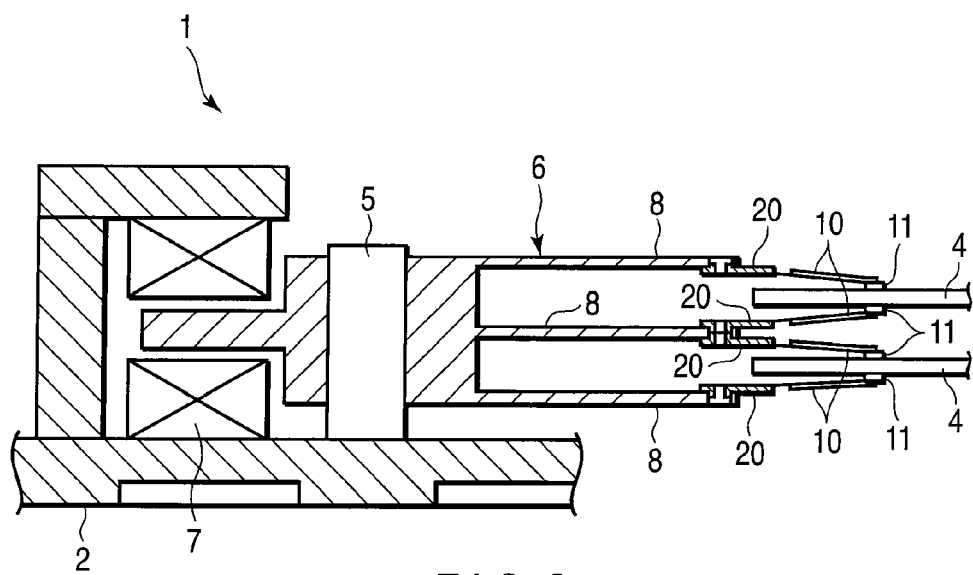
FIG. 2 is a partial sectional view of the disk drive shown in FIG. 1.

FIG. 2 is a sectional view typically showing a part of the disk drive 1. As shown in FIG. 2, the carriage 6 is provided with a plurality of actuator arms 8. A disk drive suspension (hereinafter simply referred to as a "suspension") 10 is mounted on a suspension bearing surface 9 (FIG. 6) formed on each actuator arm 8.

A slider 11 that constitutes a magnetic head is disposed on the distal end of each suspension 10. If the disks 4 rotate at high speed about the spindle 3, an air bearing is formed between each disk 4 and slider 11. If the actuator arms 8 are turned by the positioning motor 7, the suspensions 10 move diametrically relative to the disks 4. Thereupon, each slider 11 moves to a desired track of the disk 4. Each slider 11, which functions as the magnetic head, comprises a reading element and writing element (not shown).

Figure 4:
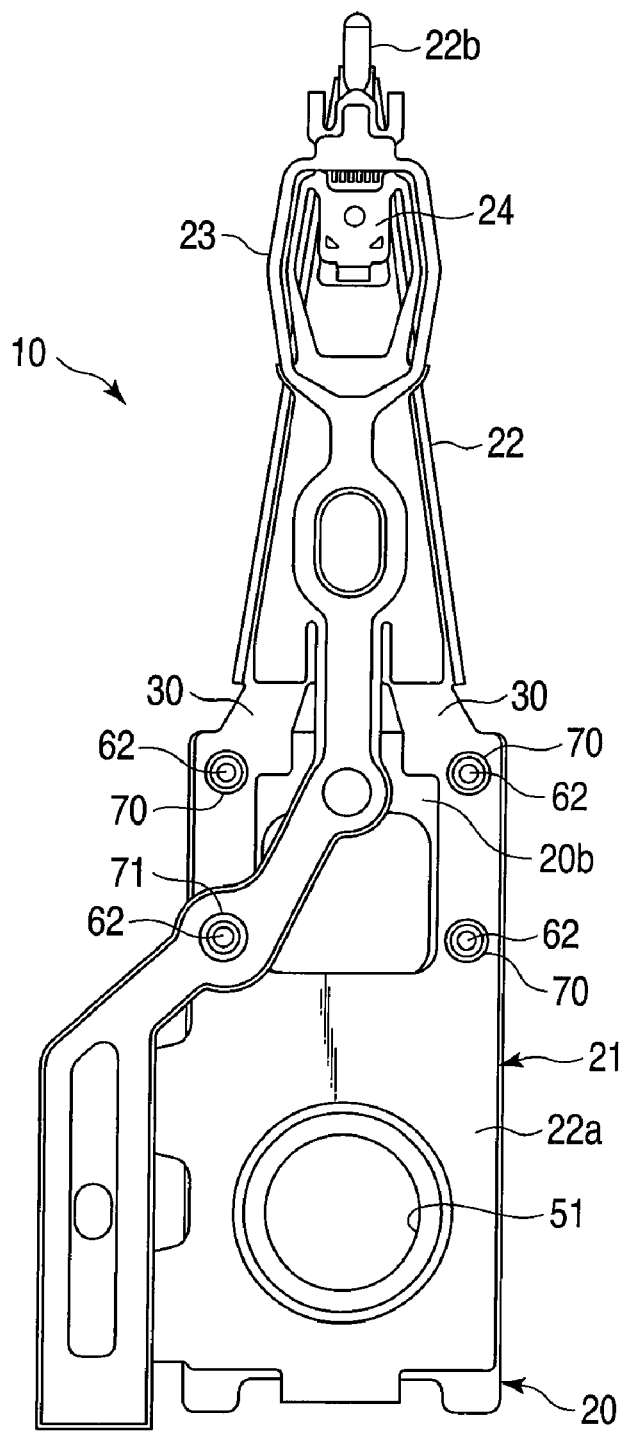
FIG. 4 is a plan view of the suspension taken from the side opposite from FIG. 3.
Figure 5:
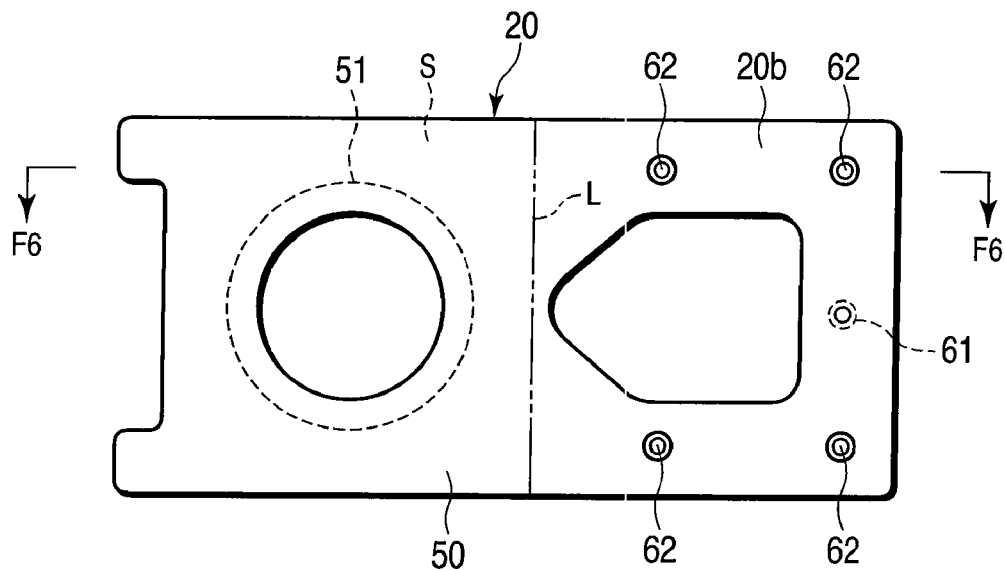
FIG. 5 is a plan view of a baseplate of the suspension shown in FIG. 3.

FIG. 3 shows an example of the suspension 10. FIG. 4 is a plan view of the suspension 10 taken from the side opposite from FIG. 3. The suspension 10 comprises a base portion 21 including a baseplate 20, load beam 22, flexure 23 with conductors, etc. FIG. 5 shows an example of the baseplate 20. The baseplate 20 will be described in detail later.

As shown in FIGS. 3 and 4, the load beam 22 comprises a proximal portion 22*a* and distal end portion 22*b*. The proximal portion 22*a* of the load beam 22 is laid on the baseplate 20. The proximal portion 22*a* is fixed to the baseplate 20 by fixing means, such as laser welding. The load beam 22 is about 30 to 100 μm thick, for example. A pair of springy hinge portions 30 are formed on a part of the load beam 22.

The hinge portions 30 are formed near the baseplate 20 and can bend relative to its thickness. Instead of forming the hinge portions 30 on the load beam 22, a hinge member thinner than the baseplate 20 may be disposed between the baseplate 20 and load beam 22.

The flexure 23 is laid on the load beam 22 relative to its thickness so as to extend along the load beam 22. A tongue portion (gimbal portion) 24 is disposed near the distal end of the flexure 23. As shown in FIG. 3, the slider 11 is mounted on the tongue portion 24.

The baseplate 20 is formed of austenite stainless steel, such as SUS304 or SUS305. The baseplate 20 is fabricated by press forming. Further, the hardness and surface condition of the baseplate 20 are adjusted by a heat treatment. The baseplate 20 is thicker than the load beam 22 and is, for example, 100 μm thick or more.

Figure 6:
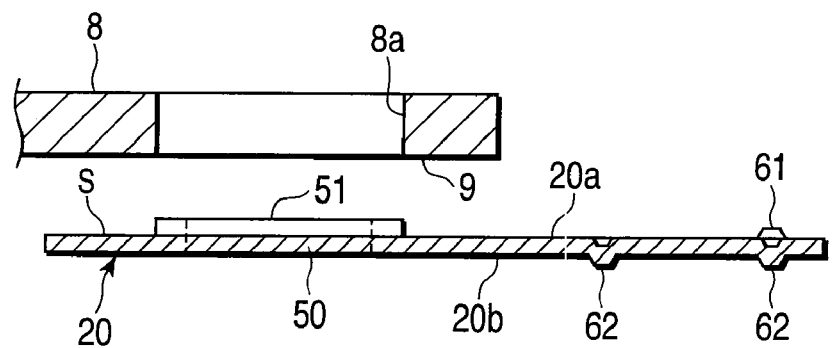
FIG. 6 is a sectional view showing a part of an actuator arm and a profile of the baseplate taken along line F6-F6 of FIG. 5.

The baseplate 20 comprises a plate portion 50 and boss portion 51. The plate portion 50 of the baseplate 20 has a first surface 20*a* and second surface 20*b*. As shown in FIG. 6, the first surface 20*a* faces the suspension bearing surface 9 of the actuator arm 8. The second surface 20*b* is located opposite from the first surface 20*a*. The first and second surfaces 20*a* and 20*b* are flat. The boss portion 51 is press-formed into a short cylindrical shape. The boss portion 51 projects outwardly from the first surface 20*a* relative to the thickness of the baseplate 20.

The first surface 20*a* comprises a flat reference mounting surface S. The reference mounting surface S is formed on the side of the boss portion 51 with respect to a two-dot chain line L shown in FIG. 3. The mounting surface S contacts the suspension bearing surface 9 when the baseplate 20 is fixed to the actuator arm 8.

A first protrusion 61 is formed in a region of the first surface 20*a* of the baseplate 20 off the reference mounting surface S. The first protrusion 61 is formed so as to project outwardly relative to the thickness of the baseplate 20 from the first surface 20*a*. Second protrusions 62 are formed on the second surface 20*b*. The second protrusions 62 are formed so as to project outwardly relative to the thickness of the baseplate 20 from the second surface 20*b*. The first and second protrusions 61 and 62 are examples of protrusions according to the present invention.

The first and second protrusions 61 and 62 are formed near peripheral edges of the plate portion 50. As shown in FIGS. 5 and 6, for example, each of the protrusions 61 and 62 is in the shape of a column tapered toward its distal end. The protrusions 61 and 62 are not limited to this shape and may alternatively be, for example, columnar, prismatic, conical, pyramidal, or hemispherical.

The first and second protrusions 61 and 62 are formed on at least one of the first and second surfaces 20*a* and 20*b* so as to be at least one in number. The protrusions 61 and 62 are formed by, for example, coining the baseplate 20. Coining is a kind of plastic working performed by using press equipment.

In the coining work, the baseplate 20 is struck relative to its thickness by a die set having a precise forming surface, whereby plastic flow is caused in the baseplate 20. Thereupon, the plate portion 50 having the first and second smooth surfaces 20*a* and 20*b*, boss portion 51, first and second protrusions 61 and 62, etc., can be formed. By the coining, occurrence of contamination, which may be caused by machining such as cutting, can be avoided. The contamination is particulate dust that forms foreign matter. Recesses are press-formed on the backside of the first and second protrusions 61 and 62.

The first protrusion 61 is formed on a part of the first surface 20*a* off the reference mounting surface S. Specifically, the first protrusion 61 is located so as not to interfere with the actuator arm 8 when the baseplate 20 is fixed to the suspension bearing surface 9 of the arm 8. Thus, the baseplate 20 can be smoothly mounted on the actuator arm 8 despite the presence of the first protrusion 61. Further, the first protrusion 61 does not need to be disposed on the reference mounting surface S that requires high shape accuracy. Consequently, the mounting accuracy of the baseplate 20 on the suspension bearing surface 9 can be prevented from becoming lower.

As shown in FIG. 4, holes 70 are formed in the load beam 22, corresponding in position to the second protrusions 62. The second protrusions 62 are inserted individually into the holes 70 with the load beam 22 laid on the baseplate 20. Instead of providing the load beam 22 with the holes 70, the load beam 22 may be formed with recesses into which the second protrusions 62 can be inserted.

As shown in FIG. 4, the flexure 23 is also formed with a hole 71, which enables it to avoid interfering with its corresponding second protrusion 62. The second protrusion 62 concerned is inserted into the hole 71 with the flexure 23 laid on the load beam 22. Instead of providing the flexure 23 with the hole 71, the flexure 23 may be formed with a recess into which the second protrusion 62 can be inserted.

As shown in FIG. 6, each actuator arm 8 of the carriage 6 is provided with the suspension bearing surface 9. The baseplate 20 is fixed to the bearing surface 9. The bearing surface 9 is precisely finished by, for example, polishing so as to be flat. A circular mounting hole 8a is formed in a region of the actuator arm 8 including the suspension bearing surface 9.

Before the baseplate 20 is fixed to the suspension bearing surface 9 of the actuator arm 8, the outside diameter of the boss portion 51 is slightly smaller than the inside diameter of the mounting hole 8a of the actuator arm 8.

The boss portion 51 is inserted into the mounting hole 8a of the actuator arm 8. The boss portion 51 is pressed from the inside and plastically deformed so that its diameter increases. Thereupon, the outer peripheral surface of the boss portion 51 is fixed to the inner peripheral surface of the mounting hole 8a.

The following is a description of the effect of the baseplate 20 constructed in this manner.

After a plurality of baseplates 20 are fabricated by press forming, they are subjected to processes for deburring, washing, etc., if necessary, and then heat-treated. In this heat treatment, the baseplates 20 are charged at random into a heating furnace and heated simultaneously. In some cases, therefore, the baseplates 20 may be superposed on one another as they are heated.

Figure 7:
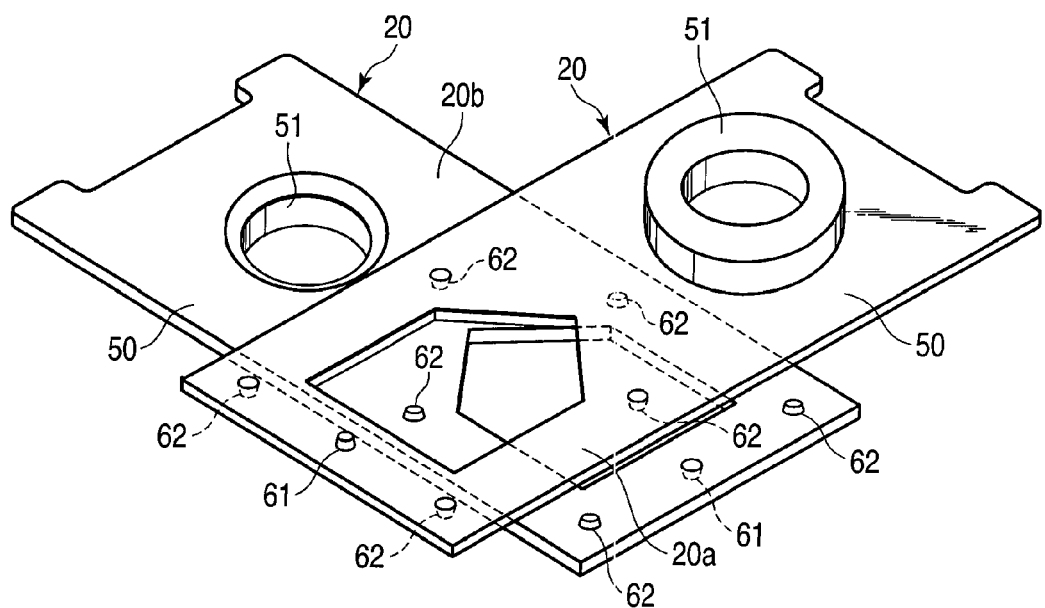
FIG. 7 is a perspective view showing how the baseplate shown in FIG. 3 is laid on another baseplate.

As shown in FIG. 7, for example, two of the baseplates 20 may be superposed as they are heat-treated. In this case, the baseplates 20 contact each other through some of the second protrusions 62, for example, so that a gap is formed between the baseplates 20. Thus, the second surface 20b of one baseplate 20 can avoid closely contacting that of the other baseplate 20.

Specifically, the superposed baseplates 20, each comprising the first and second protrusions 61 and 62, only partially contact each other. Thus, the baseplates 20 can avoid being stuck to each other by the heat treatment. If the baseplates 20 stick to each other through the first protrusion 61 or second protrusions 62, they can be easily separated from each other. As the baseplates 20 are separated, therefore, they can be prevented from being deformed, so that their yield rate of production can be improved.

Although the effect of preventing the baseplates 20 from sticking to each other during the heat treatment has been described above, the present invention is not limited to the prevention of sticking during the heat treatment. For example, the invention is also applicable to the prevention of sticking of the baseplates 20 during a surface treatment or sticking attributable to a surface tension.

A second embodiment of the present invention will now be described with reference to FIG. 8.

Figure 8:
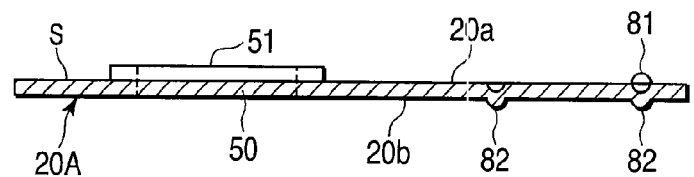
FIG. 8 is a sectional view of a baseplate according to a second embodiment of the invention.

FIG. 8 shows a baseplate 20A according to the second embodiment. The baseplate 20A comprises first and second protrusions 81 and 82 on first and second surfaces 20a and 20b, respectively. The first and second protrusions 81 and 82 are examples of protrusions according to the present invention. The protrusions 81 and 82 differ from the first and second protrusions 61 and 62 of the first embodiment in shape.

The first and second protrusions 81 and 82 of the baseplate 20A are domed. The protrusions 81 and 82 project in a circular arc from the first or second surface 20a or 20b along a profile relative to the thickness of the baseplate 20A.

Since configurations and functions other than those described above are common to the baseplates of the first and second embodiments, like numbers are used to designate common portions of these two embodiments, and a description of those portions is omitted.

According to the baseplate 20A constructed in this manner, the first and second protrusions 81 and 82 are domed. If a plurality of baseplates 20A are superposed on one another as they are heat-treated, therefore, the superposed baseplates are brought substantially into point contact with one another. Specifically, the areas of contact between the superposed baseplates 20A are very limited, compared to the case of surface contact between the plate portions 50. Thus, the baseplates 20A can be prevented more effectively from sticking to one another due to the heat treatment.

A third embodiment of the present invention will now be described with reference to FIGS. 9 and 10.

A baseplate 20B according to the third embodiment shown in FIGS. 9 and 10 comprises first and second protrusions 91 and 92 on first and second surfaces 20a and 20b, respectively. The first and second protrusions 91 and 92 are examples of protrusions according to the present invention.

The first and second protrusions 91 and 92 are riblike. The first protrusions 91 are located off a reference mounting surface S on the first surface 20a. In other words, the first protrusions 91 are located so as to be kept apart from an actuator arm 8. Each first protrusion 91 extends in a continuous straight line transversely relative to the plate portion 50. Each second projection 92 extends in a continuous straight line transversely relative to the plate portion 50 on the second surface 20b.

The first and second protrusions 91 and 92 are formed by press-forming the plate portion 50. The protrusions 91 and 92 project outwardly in a circular arc relative to the thickness of the baseplate 20B from the first and second surfaces 20a and 20b, respectively.

Each of the first and second protrusions 91 and 92 is not limited to the shape of the straight line, when viewed vertically from above or below, and may alternatively be in a continuous line curved or bent at a plurality of points. The direction in which each of the protrusions 91 and 92 continuously extends is not limited to the transverse direction of the plate portion 50. Further, second protrusions 62 similar to those of the first embodiment may be formed on the second surface 20b of the baseplate 20B.

Since configurations and functions other than those described above are common to the baseplates of the first and third embodiments, like numbers are used to designate common portions of these two embodiments, and a description of those portions is omitted.

A fourth embodiment of the present invention will now be described with reference to FIGS. 11 and 12.

Figure 11:
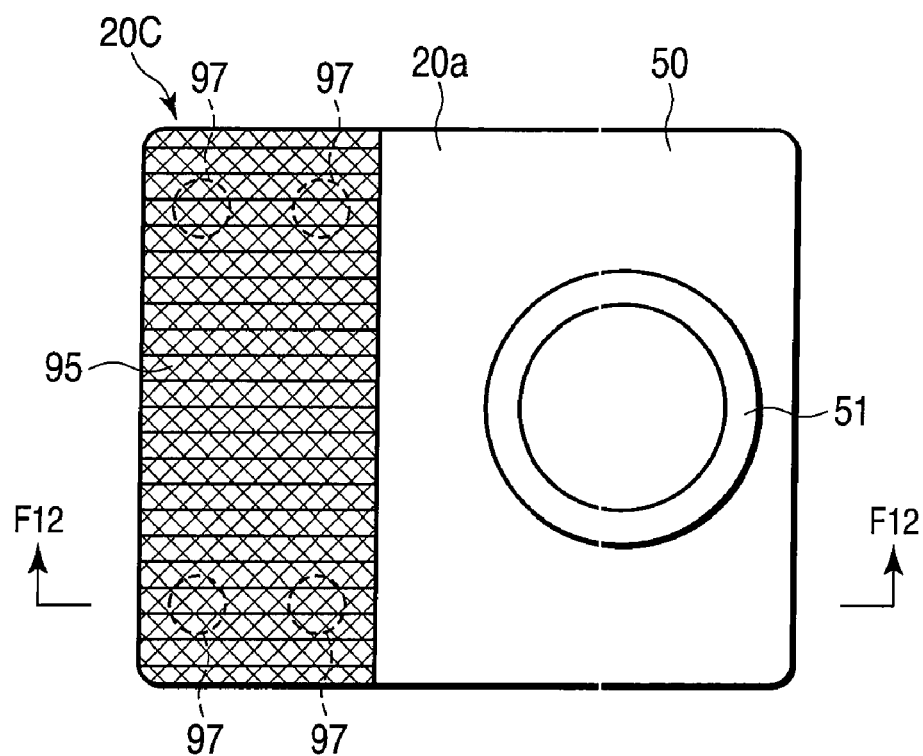
FIG. 11 is a plan view of a baseplate according to a fourth embodiment of the invention.
Figure 12:
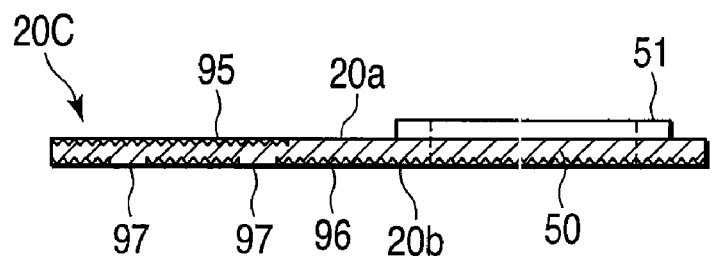
FIG. 12 is a sectional view of the baseplate taken along line F12-F12 of FIG. 11.

In a baseplate 20C according to the fourth embodiment shown in FIGS. 11 and 12, rough surfaces 95 and 96 are formed on first and second surfaces 20a and 20b, respectively, of a plate portion 50. The rough surfaces 95 and 96 are formed of a large number of minute press-formed irregularities. The rough surfaces 95 and 96 are formed by a surface treatment called texturing. These rough surfaces 95 and 96 constitute protrusions according to the present invention.

The rough surfaces 95 and 96 may be provided partially or substantially entirely covering the first and second surfaces 20a and 20b.

Flat portions 97 for welding are formed individually on those parts of the second surface 20b to which the load beam 22 is fixed by laser spot welding or the like. The flat portions 97 are portions that are left flat without being covered by the rough surface 96.

Since configurations and functions other than those described above are common to the baseplates of the first, second and fourth embodiments, like numbers are used to designate common portions of these three embodiments, and a description of those portions is omitted.

It is to be understood, in carrying out the present invention, that the structures and arrangements of the constituent elements of the suspension, including the plate portion, boss portion, protrusions, and reference mounting surface of the baseplate, may be suitably modified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension comprising:
   a baseplate fixed to a suspension bearing surface of an actuator arm of a disk drive; and
   a load beam mounted on the baseplate,
   wherein the baseplate comprises a first surface including a reference mounting surface in contact with the suspension bearing surface of the actuator arm, a second surface located opposite from the first surface, a boss portion configured to be inserted into a mounting hole formed in the actuator arm, and at least one protrusion formed on each of the first and second surfaces of the baseplate so as to project outwardly relative to a thickness of the baseplate from the second surface and an area of the first surface which does not include the reference mounting surface.

2. The disk drive suspension of claim 1, wherein a hole into which the protrusion is inserted is formed in a region of the load beam which overlaps the baseplate.

3. The disk drive suspension of claim 1, wherein the protrusion is shaped so as to project in a circular arc from the first or second surface along a profile relative to the thickness of the baseplate.

4. The disk drive suspension of claim 1, wherein the protrusion is formed of a rough surface comprising a large number of minute irregularities on the baseplate.

5. A disk drive suspension comprising:
   a baseplate fixed to a suspension bearing surface of an actuator arm of a disk drive; and
   a load beam mounted on the baseplate,
   wherein the baseplate comprises a first surface including a reference mounting surface in contact with the suspension bearing surface of the actuator arm, a second surface located opposite from the first surface, a boss portion configured to be inserted into a mounting hole formed in the actuator arm, and a protrusion formed so as to project outwardly relative to a thickness of the baseplate from at least one of the second surface and a part of the first surface off the reference mounting surface,
   wherein the protrusion is formed of a rough surface comprising a large number of minute irregularities on the baseplate.

* * * * *